US006554460B1

(12) United States Patent
Saladin

(10) Patent No.: US 6,554,460 B1
(45) Date of Patent: Apr. 29, 2003

(54) ELLIPTICAL TYPE MOTOR VEHICLE HEADLIGHT WITH TWO LIGHTING FUNCTIONS

(75) Inventor: Denis Saladin, Bourg la Reine (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 09/569,214

(22) Filed: May 11, 2000

(30) Foreign Application Priority Data

May 12, 1999 (FR) ........................................... 99 06098

(51) Int. Cl.[7] ................................................ B60Q 1/04

(52) U.S. Cl. ....................... 362/539; 362/512; 362/513; 362/302

(58) Field of Search ................................ 362/512, 513, 362/539, 518, 507, 303, 351, 487, 509

(56) References Cited

U.S. PATENT DOCUMENTS

| | | | | |
|---|---|---|---|---|
| 4,851,968 A | * | 7/1989 | Nino | 362/539 |
| 5,213,406 A | | 5/1993 | Neumann et al. | 362/512 |
| 5,264,993 A | | 11/1993 | Neumann et al. | 362/510 |
| 5,636,917 A | * | 6/1997 | Furami | 362/538 |
| 5,673,990 A | * | 10/1997 | Neumann | 362/513 |
| 5,718,505 A | | 2/1998 | Daumueller et al. | 362/279 |

FOREIGN PATENT DOCUMENTS

| | | |
|---|---|---|
| DE | 195 01 173 | 7/1996 |
| DE | 195 37 838 | 4/1997 |
| FR | 2 657 681 | 8/1991 |
| FR | 2 704 044 | 10/1994 |

OTHER PUBLICATIONS

French Search Report dated Jan. 17, 2000.

* cited by examiner

*Primary Examiner*—Sandra O'Shea
*Assistant Examiner*—Hargobind S. Sawhney
(74) *Attorney, Agent, or Firm*—Morgan & Finnegan, LLP

(57) ABSTRACT

A motor vehicle headlight of the elliptical type, giving both a dipped beam and a main beam, has a light source which cooperates with a reflector to produce a patch of light, with a lens projecting the patch of light on the road, and a movable mask being arranged so that, in a working position, it masks a part of the light patch so that the lens produces a cut-off beam, while in an inactive or retracted position of the mask, the lens projects essentially the whole of the light patch so as to produce a beam without any cut-off. The reflector comprises a first zone which produces a first part of the light patch, not significantly masked by the mask in its working position, and a second zone which produces a second part of the light patch. This second part is cut off by the mask in its working position to a much greater extent. The two parts of the light patch have different distributions of the light in a direction transversely to the direction of projection.

12 Claims, 6 Drawing Sheets

ELLIPTICAL TYPE MOTOR VEHICLE HEADLIGHT WITH TWO LIGHTING FUNCTIONS

FIELD OF THE INVENTION

The present invention relates in general terms to headlights of the elliptical type for motor vehicles.

In this specification, a headlight of the elliptical type means a headlight comprising a light source which cooperates with a reflector adapted to reflect rays from the light source towards a zone of concentration of light, which is situated in front of the light source (and which is for example a region containing the second focus of an ellipsoid of revolution, in a basic case). The patch of light which is formed in this light concentrating zone is projected on the road, typically through a planar-convex lens.

BACKGROUND OF THE INVENTION

It is already known to provide a headlight of the elliptical type as defined above, with both a dipped beam and a main beam function which comprises, in the region of the light patch to be projected, a mask or screen which is retractable, and which has an upper edge that defines an overall cut-off line at the top of a dipped beam when the mask is in its position for cutting out, or occulting, a part of the light; while, in the retracted position of the mask, all of the patch of light is projected through the lens in order to constitute a main beam.

One difficulty of this type of known headlight lies in the fact that the patch of light, which has to be suitable for both types of beam, must be obtained through a compromise between, firstly, the need to give the dipped beam a substantial width and a moderate patch of concentrated light in the axis of the road, and secondly, the need to give the main beam a substantially greater degree of concentration in the axis of the road, given also that the dipped beam typically has to be deflected through about 1% downwards, which redirects the light in a manner which is prejudicial to obtaining a substantial quantity of light just above the axis in the main beam. Thus, the reflector of a headlight of that type is designed as a function of that compromise, and all attempts to optimise one of the two beams leads of necessity to a reduction in the qualities of the other beam.

In addition, it is known, particularly from French patent specification No. FR 2 704 044A in the name of the Company Valeo Vision, to provide a headlight of the elliptical type which, because of a particular design of the reflector, gives various configurations for the patch of light in the concentration zone. However, the above mentioned French patent specification in no way resolves the problem discussed above, namely that if the configuration of a light patch is optimised for one of the beams, the other beam will be of mediocre quality.

DISCUSSION OF THE INVENTION

An object of the present invention is to overcome these drawbacks.

According to the invention, a dual function headlight of the elliptical type for a motor vehicle, comprising a light source cooperating with a reflector to form a patch of light in a light-concentrating zone, a lens adapted to project the light patch towards the road, and a movable mask which is adapted so that, in a working position thereof, it cuts off a part of the light patch so that the lens projects a cut-off beam, while in a retracted or inactive position of the mask, the lens projects substantially the whole of the said light patch so as to form a beam without the said cut-off, is characterised in that the reflector comprises two zones, in which a first said zone is adapted to produce a first part of the light patch which is substantially not masked by the said mask in any position of the latter, with a second said zone being adapted to produce a second part of the light patch which is substantially masked by the mask when the latter is in its working position, and in that the two parts of the light patch give different distributions of the light in a direction transverse to the direction of projection.

Various preferred features of the invention, which are however given by way of non-limiting example only, are as follows:

- the two zones of the reflector are arranged one above the other;
- the two zones of the reflector are separated by a generally horizontal plane;
- the generally horizontal plane is substantially at the same height as the light source;
- the two zones of the reflector are separated by two inclined half planes, which lie on either side of a vertical axial plane;
- the two parts of the light patch have different distributions of the light in a lateral direction;
- the two parts of the light patch have different distributions of the light in a vertical direction;
- the part of the light patch produced by the first zone of the reflector has a width which is greater than that of the part of the light patch produced by the said second reflector zone;
- the part of the light patch produced by the first zone of the reflector produces a concentration in the axis of the road which is smaller than that of the part of the light patch produced by the second reflector zone;
- the part of the light patch produced by the first zone of the reflector has a thickness which is greater than that of the part of the light patch produced by the second reflector zone;
- the part of the light patch produced by the second zone of the reflector produces a portion of the beam which is spread widthwise and which is situated above a substantially horizontal lower limit, and a concentrated portion of the beam which straddles the said lower limit;
- the cut-off beam is a dipped passing beam, and in that, without the said cut-off, the beam is a main beam.

Further features, objects and advantages of the present invention will appear more clearly on a reading of the following detailed description of a preferred embodiment of the invention. This description is given by way of non-limiting example only and with reference to the accompanying drawings.

DESCRIPTION OF A PREFERRED EMBODIMENT OF THE INVENTION

Figure 1:
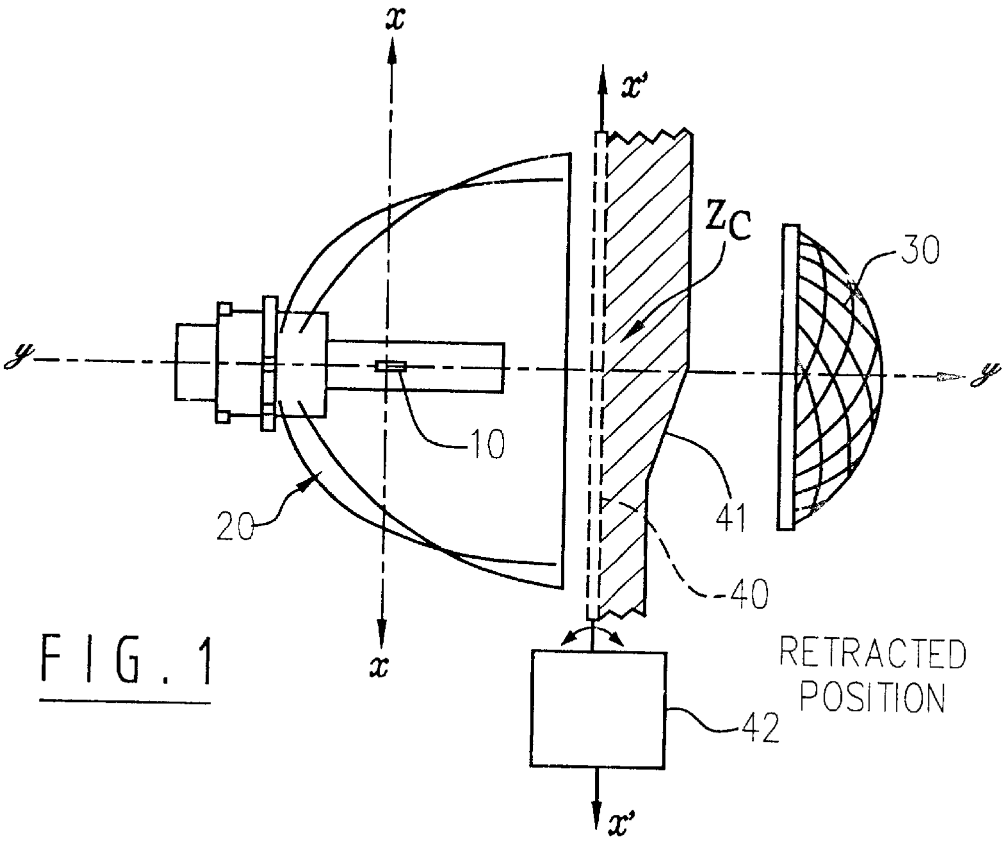
FIG. 1 is a diagrammatic view in horizontal axial cross section of a headlight in accordance with the invention giving a dipped beam and a main beam.
Figure 3:
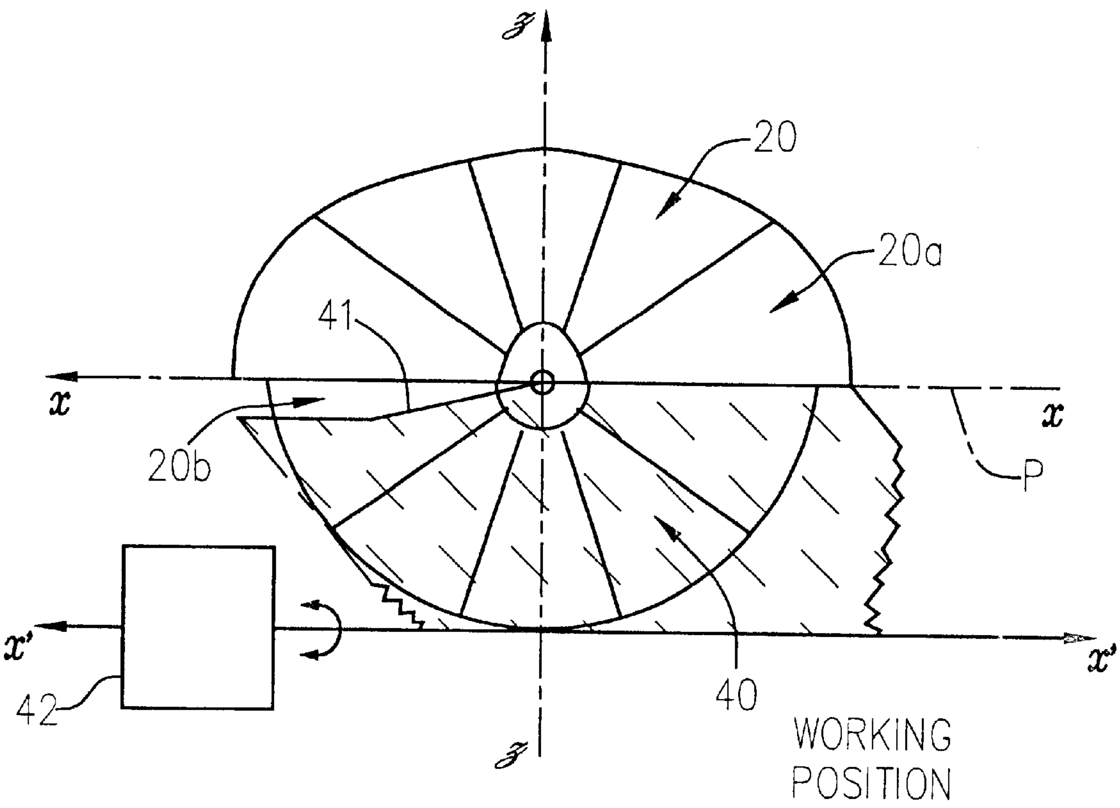
FIG. 3 is a view similar to FIG. 2, but with the mask here shown.

Reference is first made to FIGS. 1 and 3. FIG. 1 shows a reflector that comprises a light source 10 which is mounted within a reflector 20. The light source 10 consists for example of the filament of an incandescent lamp or the arc of a gas discharge lamp, but in this example, the light source is a discharge lamp. A typical example of an incandescent lamp in this context is a normalised incandescent lamp of the H7 type or the like.

A planar-convex lens 30 is arranged in front of the reflector, so as to project on the road a concentrated patch of light formed by the reflector 20 within a light-concentrating zone ZC situated between the reflector and the lens. In addition, a movable mask 40 is arranged so that it can occupy a generally vertical working position (shown in full lines), in which it cuts off a well defined portion of the light patch in such a way that the lens 30 then projects on the road a beam which is bounded by a top cut-off line. This line is defined by the upper edge 41 of the mask (FIG. 3). The mask can be moved into an inactive position in which the patch of light formed by the reflector is left intact.

The mask 40 can be arranged to be moved between its two positions by any known means. In particular, the mask may be tilted by means of an electromagnet 42, which is controlled from the facial panel of the vehicle.

In addition, and in an entirely conventional way which is not shown in the drawings, the headlight may include a front closure glass or lens, together with the usual casing and structural components and so on.

Figure 2:
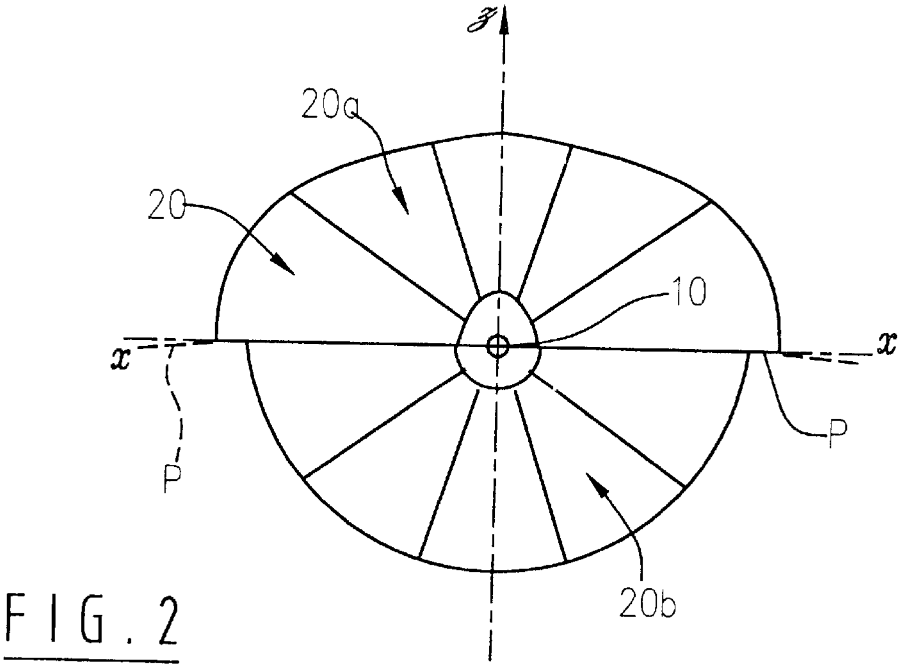
FIG. 2 is a front view of the reflector of the headlight shown in FIG. 1, and does not show the mask for forming a cut-off beam.
Figure 4B:
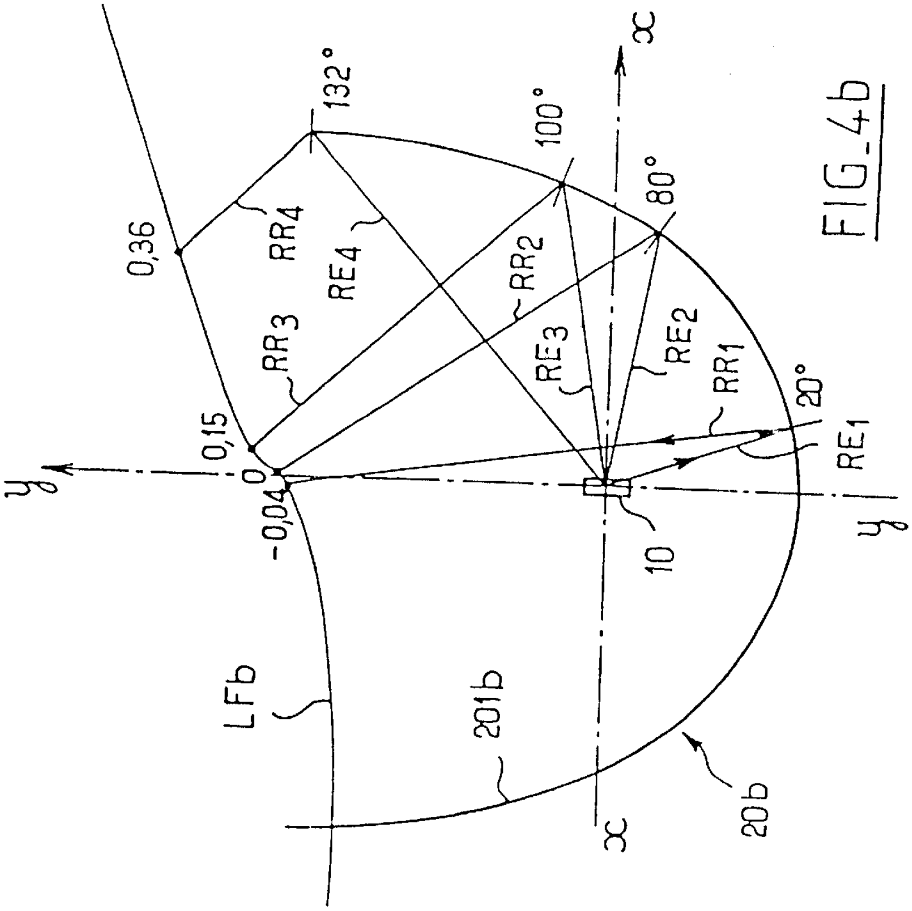
FIGS. 4*b* and 4*c* is a view in horizontal axial cross section of the reflector in the region of the upper edge of its lower zone. This Figure again shows the optical behaviour of the reflector.

Reference is now made to FIG. 2, in which the reflector 20 is sub-divided into two zones, namely an upper zone 20*a* and a lower zone 20*b*. These two zones are separated by a boundary plane P which in the present example is substantially horizontal and which lies at the same height as the light source 10 and on a longitudinal axis y—y of the headlight. In another version, shown in FIG. 4*c*, the boundary between the two zones may have a different geometry, being for example formed in two half planes, such as P and P', which are situated in the left and right hand halves of the reflector. These planes may be inclined to the horizontal.

The two zones 20*a* and 20*b* are so designed as to produce, respectively, two parts of the light patch which is formed in the light-concentrating zone ZC, and such that one of the parts of the patch has a different configuration from the other in terms of widthwise spread and/or maximum light intensity in the region of the axis y-y, and/or vertical thickness.

The part of the patch of light (also called the first part) formed by the zone 20*a* of the reflector is arranged to be mainly above the horizontal axial plane xy, that is to say below this plane after being projected through the lens 30. In this way, it is substantially not cut off (occulted) by the mask 40 in the working position of the latter, while the part of the patch which is formed by the lower zone 20*b* of the reflector (also called the second part) is arranged to be mainly below the horizontal axial plane xy, that is to say above that plane after being projected through the lens 30, so that this part of the light patch is substantially cut off by the mask 40 when the latter is in its working position.

It will be understood that with such a combination of reflector zones and associated parts of the light patch, it will be possible to optimise the configuration of the light in the dipped passing beam which consists mainly of the part of the light patch produced by the upper zone 20*a* of the reflector. Similarly, the part of the light patch which is produced by the lower zone 20*b* of the reflector will be configured specifically so that, in cooperation with the other part of the light patch, it enables a satisfactory configuration to be given to the main beam produced by the headlight.

In the present example, the upper and lower zones 20*a* and 20*b* of the reflector are designed as is described in French patent specification No. FR 2 704 044A in the name of the Company Valeo Vision, to which reference should be made for all the necessary details.

Figure 4A:
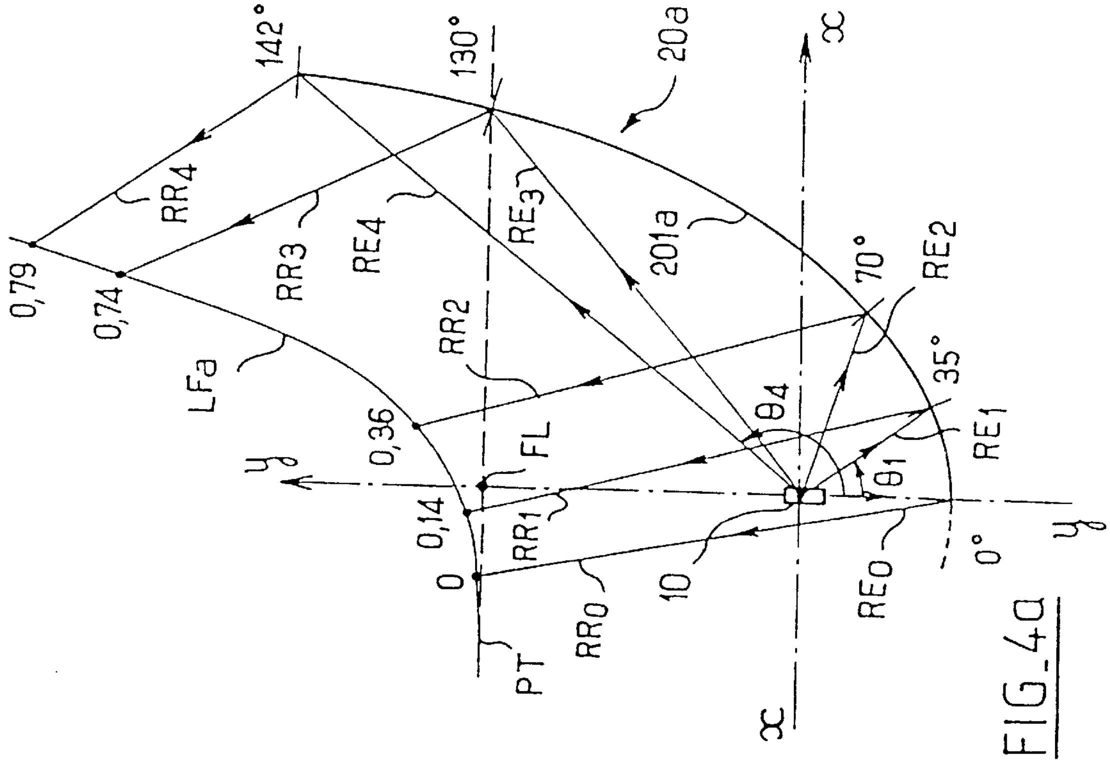
FIG. 4*a* is a view in horizontal axial cross section of the reflector in the region of the lower edge of its upper zone. This Figure shows the optical behaviour of the reflector.
Figure 4C:
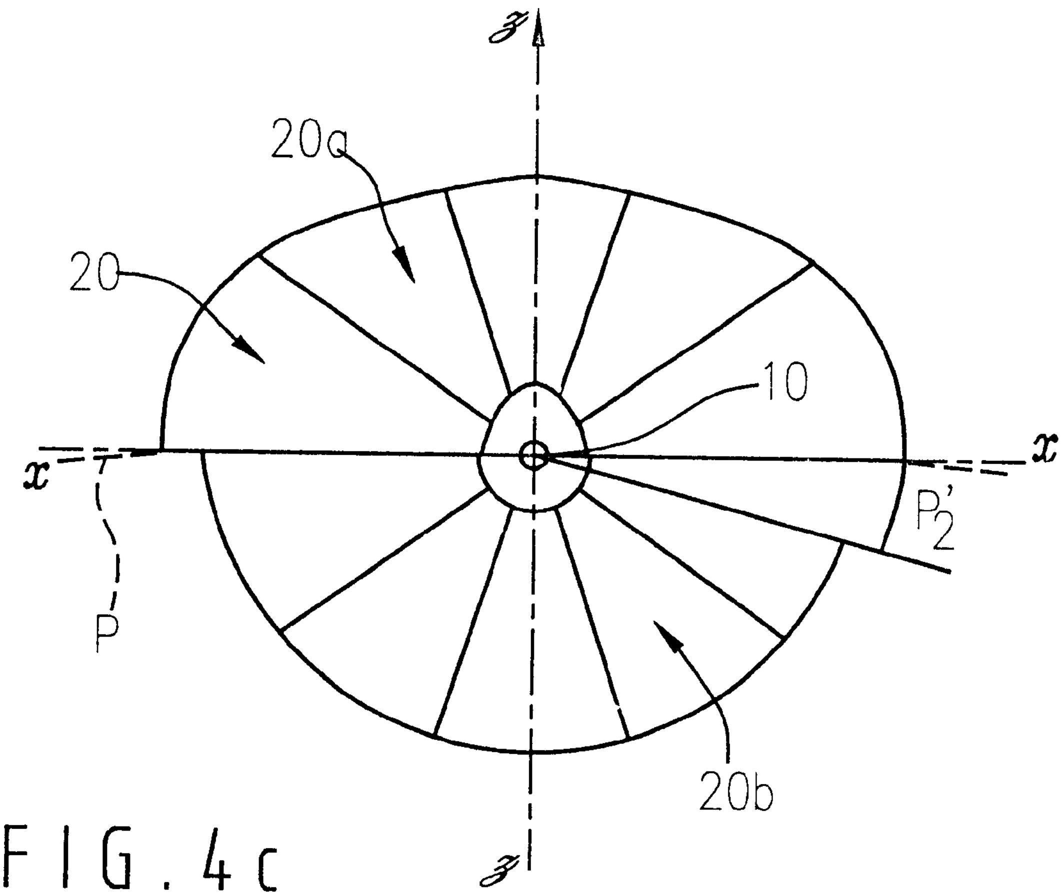

The design of the upper reflector zone 20*a* is shown in detail in FIG. 4*a*. The section of the zone 20*a* within the plane xy, or in close proximity to that plane, is indicated at 201*a*. The vertical focal line of the light is designated at LFa, while, for different inclinations θ of the light rays RE emitted by the light source 10, the locations at which the vertical planes which contain the reflected rays RR intersect the focal line LFa are shown in the Figure. FIG. 4*a* also shows a transverse vertical plane PT which contains the focus FL of the lens 30.

In FIG. 4, the geometry is indicated in curvilinear coordinates, in which the origin 0 corresponds to a reflection by the section of the reflector which is contained within the plane yz. With the vertical focal line LFa represented in these coordinates, therefore, the point of intersection with the line LFa mentioned above will vary as a function of the value of the angle θ, which is measured here with respect to the axis y-y. Accordingly, it may simply be stated here that by suitable adjustment of the form of the focal line LFa and of the above mentioned relationship to determine the point of intersection, it is possible to produce a patch of concentrated light by adjusting at will, firstly the lateral distribution of the light and the intensity of its concentration on the axis of the road, and secondly, the thickness of the beam as a function of lateral distance from the axis y-y. The mean height of the beam can also be varied by adjusting a vertical offset of the focal line LFa with respect to the horizontal axial plane xy.

In the example shown in FIG. 4*a*, the set of rays RR, which are reflected by a particular vertical edge of the reflector contained in a vertical plane making an angle θ with respect to the vertical axial plane yz, converge vertically at points on the focal line LFa which are spaced apart in a relatively balanced way on the focal line, so that the part of the light patch which is formed by the upper zone 20*a* of the reflector is substantially spread in width, with only moderate concentration in its central region. In addition, it will be understood that the fact that the curve or focal line LFa diverges rapidly away from the focal surface of the lens 30 results in a thickening of the patch of light in the plane PT, and therefore of the part of the beam which is effectively projected.

Figure 6C:
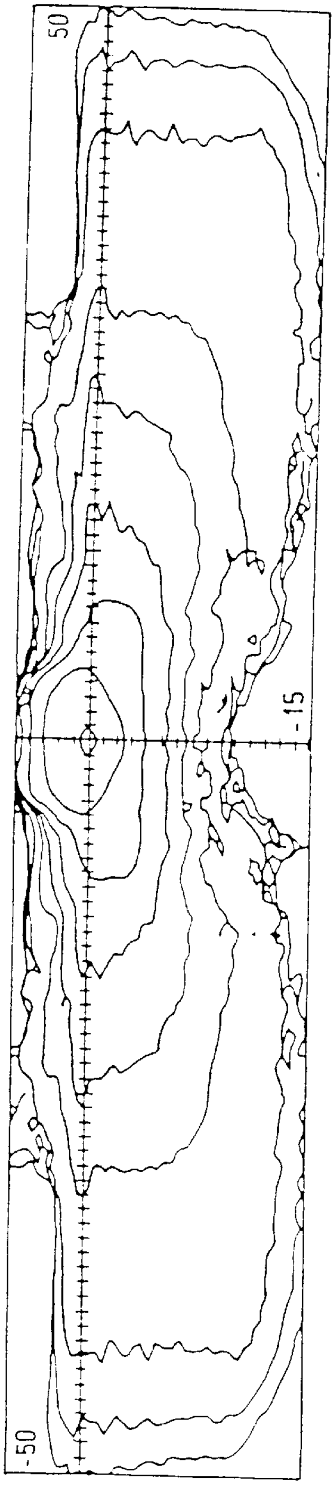
FIG. 6*c* shows the general appearance of the beam which is obtained without the mask.
Figure 6A:
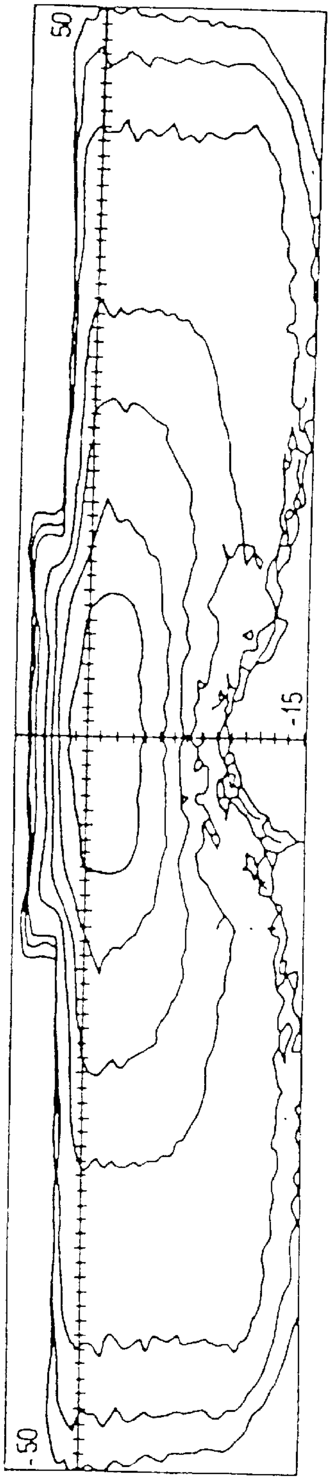
FIGS. 6*a* and 6*b* are again sets of isolux curves projected on a screen, showing the configuration of the portions of the patch of light produced by the upper and lower zones of the reflector, respectively, after projection of the light through the lens but with the cut-off mask omitted.

The appearance of this part of the beam is shown in FIG. 6*a*, which illustrates the various characteristics described above.

With reference now to FIG. 4*b*, this shows the design of the lower zone 20*b* of the reflector. It will be observed that the vertical focal line LFb associated with this zone has a mean spacing away from the plane PT which is substantially less than in the case of the line LFa, which enables a part of the light patch to be produced having a substantially smaller mean thickness. In addition, it will be noticed that all of the direct light rays RE, up to values of the angle θ of about 100°, produce reflected rays which are relatively concentrated in the vicinity of the focus FL of the lens 30, so that the part of the light patch produced is highly concentrated in the axis of the road. It will be understood that this result is obtained by choosing, for the corresponding region of the lower reflector zone 20*b*, an elliptical form or a form very close to an ellipse.

Those direct rays RE which have angles θ greater than about 100° produce reflected rays RR which diverge progressively away from the axis y-y, so as to widen the patch of light.

Figure 6B:
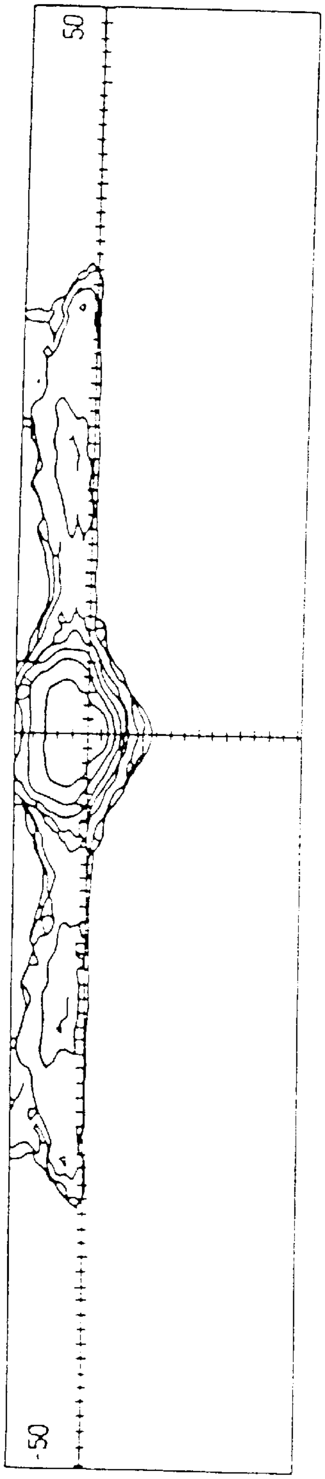

The appearance of the part of the light patch produced by the lower zone 20*b* of the reflector is shown in FIG. 6*b*, and it will be noticed that, after being projected, it lies mainly above the horizontal plane which passes through the optical axis. It will also be noticed that at the same time, the central patch of concentrated light straddles the horizontal plane, and is also mainly above that plane.

It may be observed here that, having regard to the differences explained above between the reflector zones 20*a* and 20*b* in terms of horizontal distribution of the light, these zones have horizontal cross sections (and incidentally also widths) which are different from each other in the vicinity of the horizontal axial plane xy. As a result, the reflector has a discontinuity at the level of that plane. Also shown, in FIG. 1, are the respective cross sections of the two zones. However, the divergence between the two surfaces is not liable to produce any detrimental optical errors.

As is shown, the headlight has a tilting mask 40 which is arranged to assume, selectively, a working position and an inactive or retracted position. In this connection reference is again made to FIG. 3 which shows the mask 40 in its working position, with its top edge 41 being defined by three straight segments, the middle one of which has a given inclination which is for example 15° to the horizontal. The two outer segments of the straight upper edge are horizontal and lie at different heights. This defines an overall cut-off line which delimits the light patch and therefore the projected beam, the cut-off line being adapted to the formation of a dipped passing beam that complies with European regulations.

Figure 5C:
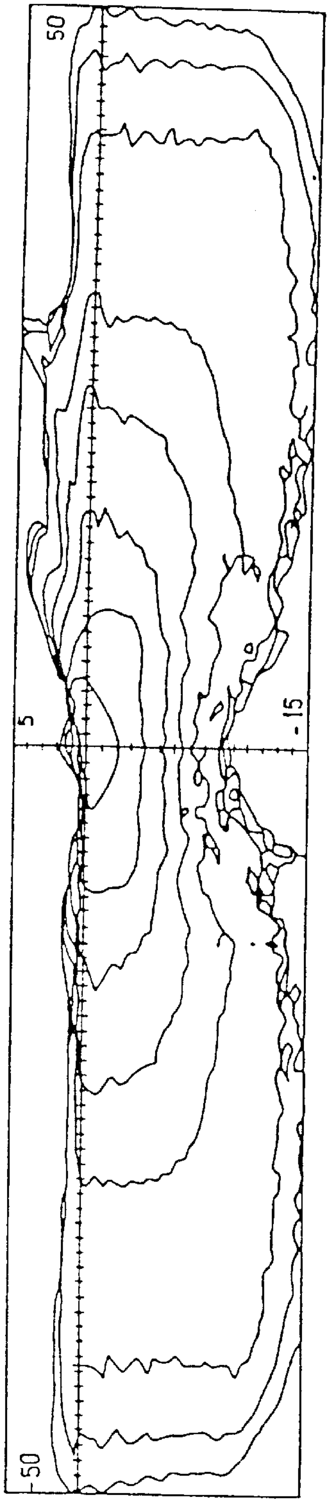
FIG. 5*c* shows the general appearance of the beam obtained with this mask.
Figure 5A:
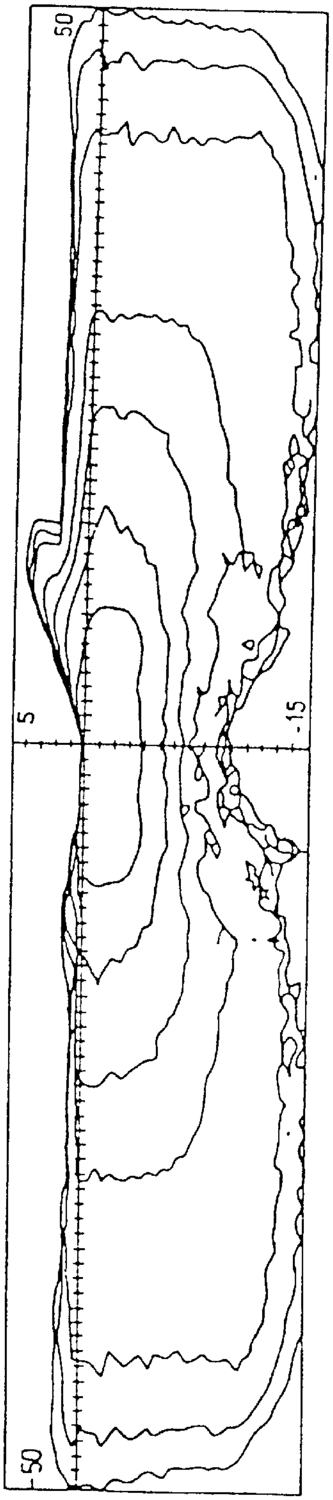
FIGS. 5*a* and 5*b* are sets of isolux curves projected on a screen, showing the configuration of the parts of the patch of light which are produced by the upper and lower zones, respectively, of the reflector after being projected through the lens, with the mask interposed on the beam so as to form the cut-off.
Figure 5B:
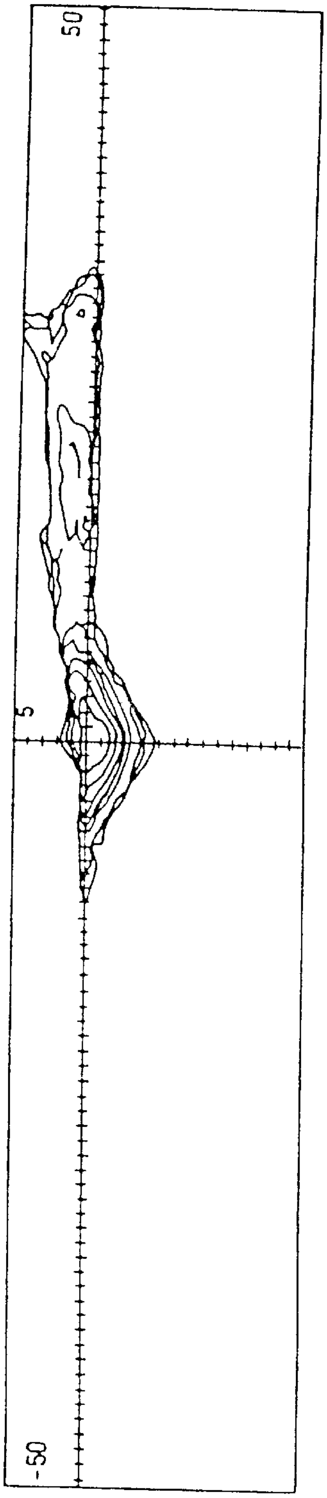

Reference is now made to FIGS. 5*a* and 5*b*, which show the configuration of the parts of the beam which are produced respectively by the upper and lower reflector zones 20*a* and 20*b* with the mask 40 in its working position shown in FIG. 3. As to FIG. 5*c*, this shows the overall configuration of the dipped passing beam so obtained. It will be noticed that the configuration shown in FIG. 5*a* gives the basis for the dipped passing beam, having the following features:

a large width, for example of the order of ±50°;

moderate concentration on the axis of the road, which is typically of the order of 10,000 Cd;

progressive diminution of the quantity of light going from the centre towards the side edges; and finally a well-defined cut-off line.

The configuration of the light as shown in FIG. 5*b* serves to reinforce, in measured proportions, the amount of light on the axis.

As to FIGS. 6*a* and 6*b*, these show the configuration of the parts of the light patch which are produced by the upper and lower zones 20*a* and 20*b* of the reflector when the mask 40 is in its retracted position and therefore not interrupting the beam. The resulting beam is generally illustrated in FIG. 6*c*. It will be noted that the part of the light patch produced by the lower zone 20*b* gives an extremely concentrated patch of light in and above the axis of the road. Typically, the lower zone 20*b* can give rise to a light intensity of the order of 50,000 Cd in the axis of the road, so that when added to the zone 20*a*, it is possible to achieve around 60,000 Cd in the axis.

The present invention is of course in no way limited to the embodiment described above and shown in the drawings, but a person skilled in this technical field will be able to apply to it any variation or modification within the spirit of the invention, In particular, the present invention may be used in the design and manufacture of a pair of lights, with any kind of lighting functions whatsoever, such that at least one of the lights has a mask for cutting off a part of the light which is formed within the light-concentrating zone ZC.

What is claimed is:

1. A dual function elliptical type headlight for a motor vehicle for travel along a road, comprising: a light source; a reflector adjacent to the light source; a light concentrating zone in front of the reflector, whereby the reflector can reflect light from the light source to the light concentrating zone to produce a patch of light; a lens in front of the light concentrating zone for projecting the light patch towards the road as a beam; a mask; and means for displacing the mask between a working position in the path of said beam and a retracted position away from said beam, whereby in its working position the mask can cut off a part of the patch of light whereby the beam projected by the lens is a cut-off beam, and whereby, when the mask is in its retracted position, the lens can project the entire patch of light so that any said cut-off is absent from the beam, wherein the reflector comprises two reflector zones, being a first zone adapted to produce a first part of the light patch which is substantially unmasked in all positions of the mask, and a second zone adapted to produce a second part of the light patch which is masked when the mask is in its working position, the two said zones being such that the respective parts of the light patch have different light distributions in the direction in which the light is projected by the headlight.

2. A headlight according to claim 1, wherein the two said reflector zones are disposed one above the other.

3. A headlight according to claim 2, wherein the two reflector zones are separated by a generally horizontal plane.

4. A headlight according to claim 3, wherein the generally horizontal plane is substantially at the same height as the light source.

5. A headlight according to claim 2, wherein the reflector defines a vertical axial plane and two inclined half planes situated on either side of the vertical axial plane, with the half planes separating the two said zones of the reflector.

6. A headlight according to claim 2, wherein the reflector is adapted so that the two said parts of the light patch have different lateral distributions of the light.

7. A headlight according to claim 6, wherein the reflector is adapted so that the two said parts of the light patch have different vertical distributions of the light.

8. A headlight according to claim 6, wherein the reflector zones are so configured that the first part of the light patch is wider than the second part.

9. A headlight according to claim 6, for a vehicle for travel along a road defining an axis of the road, travel of the vehicle being substantially in the direction of the axis, the reflector zones being so configured that the first part of the light patch is less concentrated in the axis of the road than the second part.

10. A headlight according to claim 6, wherein the reflector zones are so configured that the first part of the light patch is thicker than the second part.

11. A headlight according to claim 6, defining a substantially horizontal lower limit for the beam emitted by the headlight, wherein the reflector zones are such that the second part of the light patch produces a widened portion of the beam above the lower limit and a concentrated part of the beam straddling the lower limit.

12. A headlight according to claim 1, emitting a dipped passing beam and a main beam when the mask is in its working and retracted positions respectively.

* * * * *